(12) United States Patent
Huang et al.

(10) Patent No.: US 12,020,190 B2
(45) Date of Patent: Jun. 25, 2024

(54) IDENTIFYING SOLUTION PACKAGES BASED ON DETERMINED RELATIONSHIPS

(71) Applicant: International Business Machines Corporation, Armonk, NY (US)

(72) Inventors: Lei Huang, Mountain View, CA (US); Zhixuan Qin, Mountain View, CA (US); Guangjie Ren, Belmont, CA (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 17/303,504

(22) Filed: Jun. 1, 2021

(65) Prior Publication Data

US 2022/0383220 A1    Dec. 1, 2022

(51) Int. Cl.
*G06Q 10/06* (2023.01)
*G06F 16/28* (2019.01)
*G06F 40/289* (2020.01)
*G06Q 10/0631* (2023.01)

(52) U.S. Cl.
CPC ..... *G06Q 10/06315* (2013.01); *G06F 16/288* (2019.01); *G06F 40/289* (2020.01)

(58) Field of Classification Search
None
See application file for complete search history.

(56) References Cited

U.S. PATENT DOCUMENTS

| | | | |
|---|---|---|---|
| 9,009,193 B2 | 4/2015 | Callery | |
| 9,304,745 B2 | 4/2016 | Nair | |
| 10,249,001 B2 | 4/2019 | Moran | |
| 11,295,375 B1* | 4/2022 | Chitrapura | G06Q 50/01 |
| 2009/0144261 A1* | 6/2009 | Ruml | G06F 16/9024 707/999.005 |
| 2014/0317038 A1* | 10/2014 | Mojsilovic | G06Q 10/00 706/46 |
| 2020/0167145 A1* | 5/2020 | Franchitti | G06N 5/022 |
| 2021/0139256 A1* | 5/2021 | Fu | B65G 57/02 |

OTHER PUBLICATIONS

Disclosed Anonymously, "Services Recommendation Engine using Client's Demographics", An IP.com Prior Art Database Technical Disclosure, IP.com No. IPCOM000257925D, IP.com Electronic Publication Mar. 23, 2019, 6 pages.

* cited by examiner

*Primary Examiner* — Alan Torrico-Lopez
(74) *Attorney, Agent, or Firm* — Joseph P. Curcuru

(57) ABSTRACT

In an approach to improve mining and identifying priority relationships and solution packages by identifying client-satisfied solutions packages based on determined relationships, embodiments identify business priorities and software product solutions to recommend to a user. Additionally, embodiments receive electronic representations of the software product solutions utilized by an organization, and generate software product solution relationship maps based on the received electronic representations of software product solutions utilized by the organization. Further, embodiments map received business priorities to the generated software product solution relationship maps based on keyword and key phrase searches or full text similarity using statistical methods and machine learning models, recommend solution packages based on the mapped business priorities to the generated software product solution relationship maps, and output, by a user interface, the solution packages to users.

17 Claims, 6 Drawing Sheets

IDENTIFYING SOLUTION PACKAGES BASED ON DETERMINED RELATIONSHIPS

BACKGROUND OF THE INVENTION

The present invention relates generally to the field data relationships, and more particularly to mining and identifying priority relationships and solution packages.

Solution packages are a container of customizations and components, which allows users to export customizations and reimport them into other environments. Solution packages extend the core functionality of the platform through grouped sets of features. Complex solutions that contain both specific solution components as well as other external components, an installer solution is required to import features and configurations. Solutions are comprised of a few core components. The core components are created using the customization tools available or the APIs provided. Solution packages are used in tandem with customer relationship management (CRM) software to enhance client and business success. CRM is a process in which a business or other organization administers interactions with customers, typically using data analysis to study large amounts of information. CRM systems compile data from a range of different communication channels, including a company's website, telephone, email, live chat, marketing materials and more recently, social media. CRM systems allow businesses to learn more about their target audiences and how to best cater for their needs, thus retaining customers and driving sales growth. CRM may be used with past, present or potential customers.

SUMMARY

Embodiments of the present invention disclose a method, a computer program product, and a system for identifying client-satisfied solutions packages based on determined potential relationships, the computer-implemented method comprising: identifying one or more business priorities and software product solutions to recommend to a user, wherein identifying the business priorities and the software product solutions to recommend comprises: comparing a plurality of the software product solutions and business priorities relationships using Natural Language Processing and Natural Language Understanding techniques; receiving one or more electronic representations of the software product solutions utilized by an organization, wherein the electronic representation describes the software product solution in text information; generating one or more software product solution relationship maps based on the one or more received electronic representations of one or more software product solutions utilized by the organization; mapping retrieved and received business priorities to the one or more generated software product solution relationship maps based on keyword and key phrase searches or full text similarity using statistical methods and machine learning models; recommending one or more solution packages based on the mapped business priorities to the one or more generated software product solution relationship maps; and outputting, by a user interface, the one or more solution packages to one or more users

DETAILED DESCRIPTION

Figure 1:
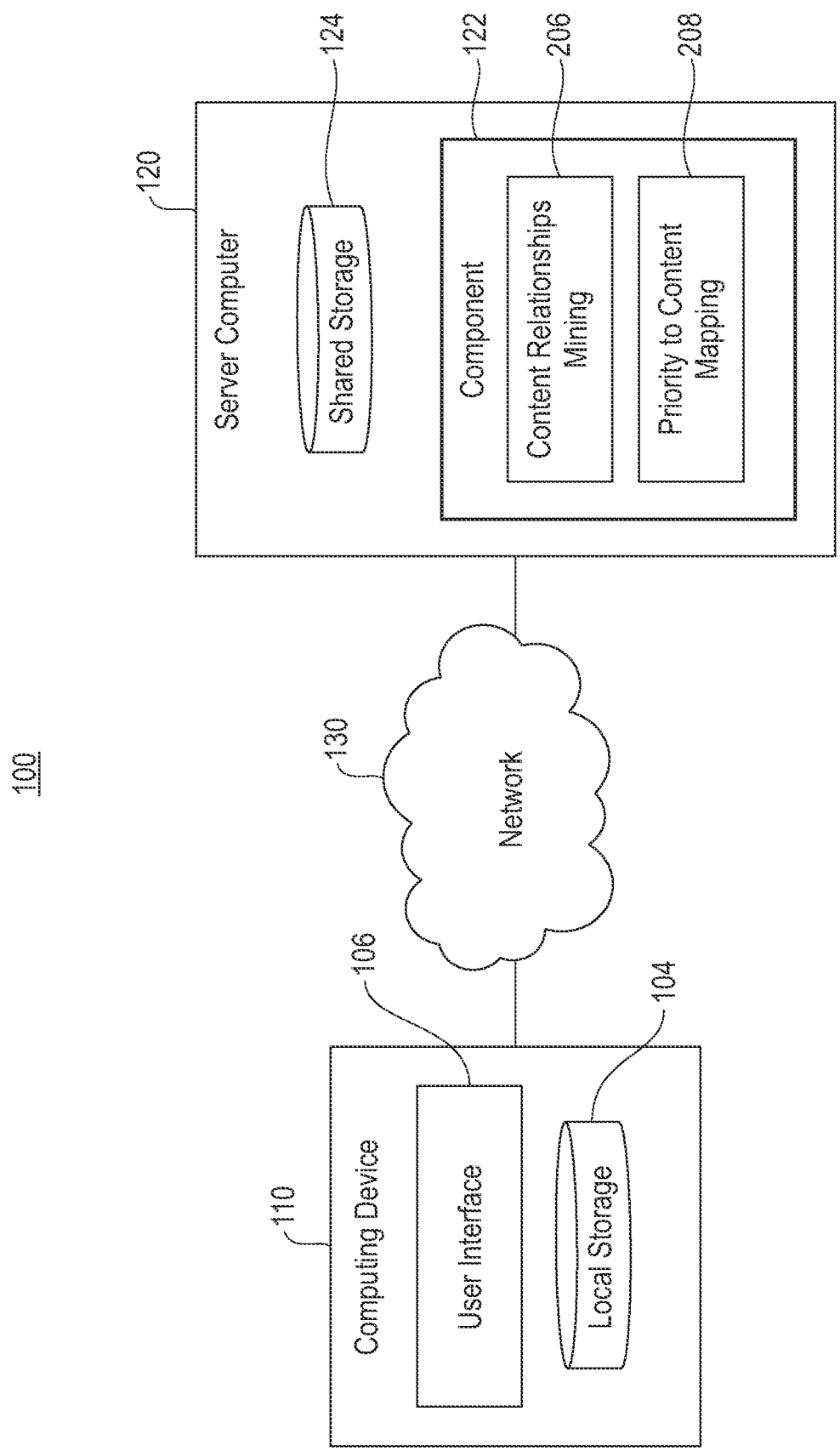
FIG. 1 is a functional block diagram illustrating a distributed data processing environment, in accordance with an embodiment of the present invention.

A key factor of business success is to understand clients' business priorities, identify potential relationships, and discover client-satisfied solution package(s). However, embodiments of the present invention recognize that it is challenging for large-scale enterprise to develop an understanding of clients' business priorities, identify potential relationships, and discover client-satisfied solution package due to large-scale enterprise characteristics and clients' characteristics. Large-scale enterprise characteristics comprise, but are not limited to: large number of projects, offerings and assets (i.e., solution items), and decentralized and disaggregated business content management. Clients' characteristics may comprise, but are not limited to: a variety of industries and sectors, diverse and customized business priorities, and a high demand in relation to efficiency and effectiveness of solution mapping (e.g., optimized solution packages).

Enterprise Innovation Accelerator (EIA) is a problem-solving digital platform where a business and one or more clients collaborate in an iterative manner to understand the one or more client's business aspirations and technical problems, and match the one or more client's business aspirations and technical problems with a high-quality curation of offerings, assets and expertise, augmented by a series of human-in-the-loop AI methods, with the goal to drive compelling innovation engagements that maximize client value. Embodiments of the present invention recognize that, given the many business priorities, many business find it difficult to identify underlying relationships with users (i.e., clients). Embodiments of the present invention improve the art and solve this particular issue by identifying the underlying relationships with users (i.e., clients) and business, which enables the generation of solution packages and maximizing the winning probability (i.e., the likelihood of successfully matching one or more client's business aspirations and technical problems with a high-quality curation of offerings, assets and expertise).

Embodiments of the present invention improve the art by enabling the understanding of client's business priorities, determining potential relationships and thereby identifying and generating client-satisfied solution packages. Embodiments of the present invention solve the particular issue(s)

stated above by: (i) discovering the business priorities and a new software product solution to recommend via a comparison of software product solutions and priorities relationships using Natural Language Processing (NLP) and Natural Language Understanding (NLU) techniques, text embedding algorithms and graph theory, wherein both business priorities and solution package and product have text information (such as, name, short description, etc.), (ii) receiving an electronic representation of the software product solutions utilized by an organization, which is described in the text information and building a software product solution relationship map, and (iii) mapping the business priorities to the software product solution relationship map based on keyword and/or key phrase search or full text similarity using statistical methods and machine learning (ML) and/or deep learning (DL) models and, discovering the new software product solutions to recommend based upon the one or more mapped business priorities.

Implementation of embodiments of the invention may take a variety of forms, and exemplary implementation details are discussed subsequently with reference to the Figures (i.e., FIG. 1-FIG. 4).

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1, computing device 110 may have a plurality of interfaces 106. In other embodiments, not depicted in FIG. 1, distributed data processing environment 100 may comprise a plurality of computing devices, plurality of server computers, and/or one a plurality of networks. Computing device 110 may include internal and external hardware components, as depicted, and described in further detail with respect to FIG. 4.

User interface (interface) 106 provides an interface to the solution package generation component (component) 122. Computing device 110, via user interface 106, may enable a user and/or a client to interact with component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 4 In some embodiments server computer 120 may represent a plurality of server computers.

Each of shared storage 124 and local storage 104 may be a data/knowledge repository and/or a database that may be written and/or read by one or a combination of component 122, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory.

In the depicted embodiment, component 122 is executed on server computer 120. In other embodiments, component 122 may be executed on computing device 110. In various embodiments of the present invention, not depicted in FIG. 1, component 122 may execute on a plurality of server computers 120 and/or on a plurality of computing devices 110. In some embodiments, component 122 may be located and/or executed anywhere within distributed data processing environment 100 as long as component 122 is connected to and/or communicates with, computing device 110, and/or server computer 120, via network 130.

In various embodiments of the present invention, based on NLP and/or NLU techniques, text embedding algorithms and graph theory, component 122 identifies and outputs priority relationships. Priority relationships may be the relationship between solution packages that match a user's (e.g., clients) priority input(s) (e.g., product request) with solution packages (e.g., digitized products, services, and/or offerings) within a predetermined threshold of acceptance. In various embodiments, component 122 receives one or more priority inputs from one or more users, wherein priority inputs are specific client needs for a particular service, or product. Solution packages are digitized products and/or services. In other embodiments, the priority inputs are predetermined. For example, a user is presented with an option to select, via a response pop-up window on interface 106, between predetermined (e.g., standardized) priority inputs or the ability to enter custom priority inputs. Responsive to receiving a user's selection, component 122 executes the predetermined priority inputs or enables the user to enter custom priority inputs via interface 106. Component 122 may optimize the generation of solution packages by generating a solution item relationship network, mapping priorities to solution items, discovering priorities relationship, and comparing generated solution packages. Component 122 is further described in FIGS. 2A-2C.

Component 122 may solve the particular issue(s) stated above by and optimize solution package generation by: (i) identifying the business priorities and a new software product solution to recommend via a comparison of software product solutions and priorities relationships using Natural Language Processing (NLP) and Natural Language Understanding (NLU) techniques, text embedding algorithms and graph theory, wherein both business priorities and solution package and product have text information (such as, name and short description), (ii) receiving an electronic representation of the software product solutions utilized by an organization, which is described in the text information and generating a software product solution relationship map, and (iii) mapping the business priorities to the software product solution relationship map based on keyword and/or key phrase search or full text similarity using statistical methods and machine learning (ML) and/or deep learning (DL) models and, discovering the new software product solutions to recommend based upon the one or more mapped business priorities.

Figure 2A:
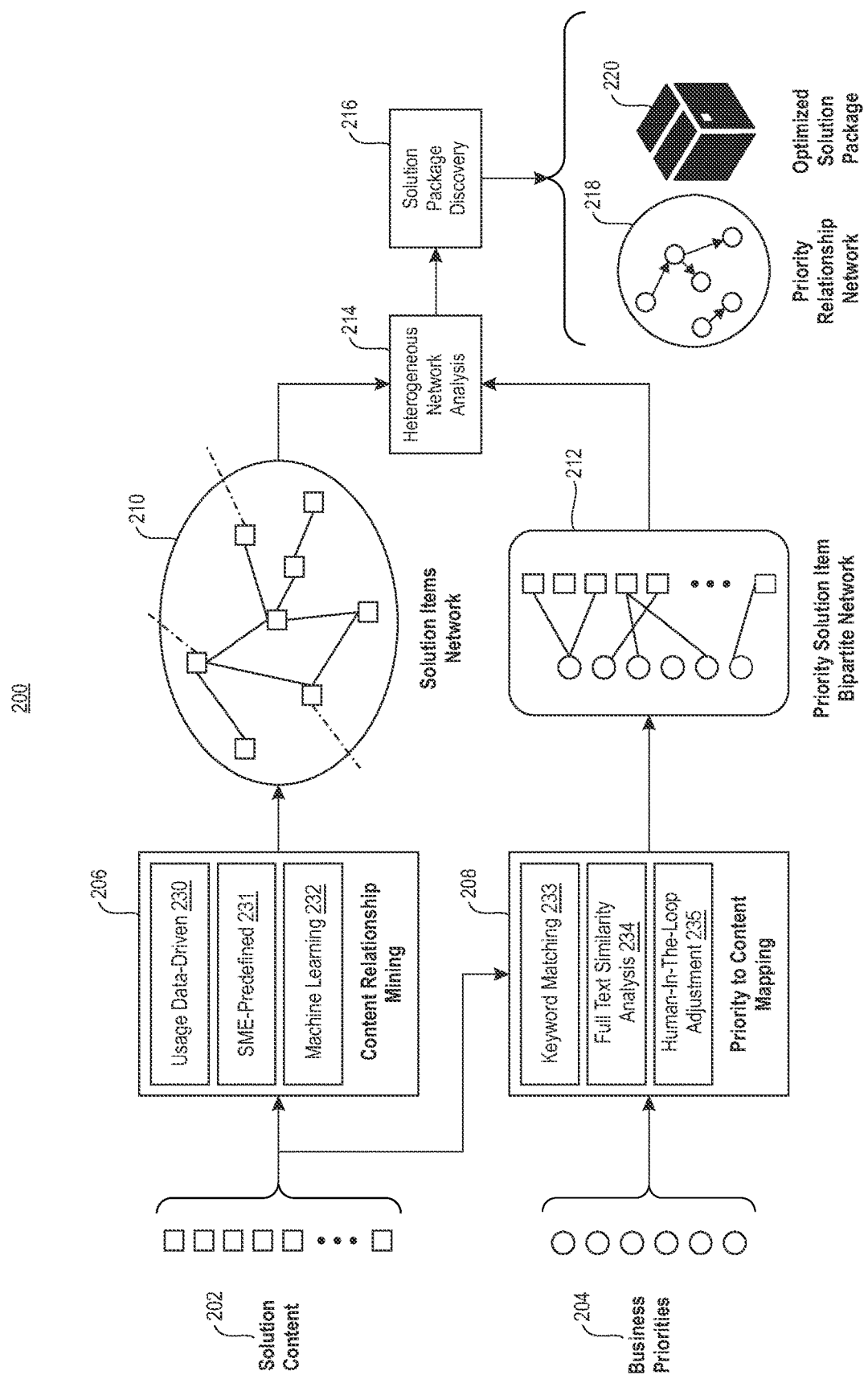
FIG. 2A illustrates dataflow example of a solution package generation component for solution item relationship mining, in accordance with an embodiment of the present invention.

FIG. 2A illustrates dataflow of component 122, generally designated 200, in communication with server computer 120 and/or computing device 110, within distributed data processing environment 100 of FIG. 1, for identifying client-satisfied solutions packages based on determined potential relationships, in accordance with an embodiment of the present invention. FIG. 2A provides an illustration of one implementation and does not imply any limitations with regard to the environments in which different embodiments may be implemented. Many modifications to the depicted environment may be made by those skilled in the art without departing from the scope of the invention as recited by the claims.

In various embodiments of the present invention, component 122 retrieves and/or receives solution contents 202 and business priorities 204. Business priorities 204 may be one or more specific needs (e.g., service, offering, product) for a particular business that are desired by a client. In some embodiments, solution contents 202 and business priorities 204 are entered by one or more users or business priorities 204 are predetermined. In various embodiments, solution contents 202 and business priorities 204 may be a combination of custom content and priorities and predetermined content and priorities. In various embodiments, component 122 may generate solution contents 202 and business priorities 204 through received client feedback, via NLP. Component 122 may retrieve historic solution contents 202 and business priorities 204 from one or more databases (e.g., local storage 104 and/or shared storage 124). In the depicted embodiment, component 122 mines relationships using various solutions contents 202 based on Subject-Matter Expert (SME) predefined relationships 231, usage-data driven relationship mining (usage data-driven) 230, and machine learning relationships (machine learning) 232. SME predefined relationships 231 are the relationships that are manually defined by SMEs. Usage-data driven 230 is the relationship associated with solution items extracted from historical solution packages. Machine learning 232 are relationships associated with priority inputs (e.g., business priorities 204) that are predicted through Machine Learning models. Relationships here include but are not limited to "part of", "prerequisite", and/or "complementary." The relationship can be directed or undirected. Meaning component 122 can be generalized to handle various relationships for different use cases.

In the depicted embodiment component 122, via priority to content mapping component (content mapping) 208, receives and/or retrieves business priorities 204 and solution content of a list of solution contents 202. Mapping the priority to solution item (i.e., mapping priority to content) is based on keyword and/or key phrase search or full text similarity by statistical methods and ML and DL models, further described in FIG. 2B. In the depicted embodiment, priority to content mapping 208 comprises keyword matching 233, full text similarity analysis 234, and human-in-the-loop adjustment 235, and generates priority solution item bipartite network 212. In the depicted embodiment, content relationships mining engine 206 feeds data (e.g., identified content relationships from usage-data driven 230, SME-predefined relationships 231, and machine learning 232), generates solution items network 210. The priority solution item bipartite network 212 and solution items network 210 will be analyzed through heterogeneous network analysis 214 to generate a heterogenous network 240.

Component 122 may create heterogeneous network by combining solution items network 210 and priority solution item bipartite network 212, wherein the identified relationships and priority mapping in content relationship mining engine 206 and priority to content mapping 208 are combined into a network and used by heterogeneous network analysis 214 to identify and output optimized solution packages 220. In various embodiments of the present invention, heterogenous network analysis 214 retrieves and/or receives data from priority solution item bipartite network 212 and solution items network 210. In various embodiments of the present invention, component 122 mines priority relationships based on solution item network 210 and priority solution item bipartite network 212. In various embodiments of the present invention, component 122 mines priority relationships through heterogeneous network analysis 214 such as, random walk with restart algorithm and matrix factorization.

In various embodiments of the present invention, component 122, via solution package discovery 216, executes a solution package discovery and comparison. Component 122, via solution package discovery 216, discovers one or more solution packages through Breadth First Search (BFS) and/or Depth First Search (DFS) to find graph paths that contains solution items covering a plurality of business priorities. Business priorities may be predetermined and/or received from a user or database. An example of component 122, via solution package discovery 216, discovering one or more solution packages is depicted in FIG. 2C. Solution package discovery 216 may comparing solution package in terms of cost, delivery time, and/or any other metric or parameter known in the art.

In various embodiments of the present invention, component 122 identifies and/or generates and outputs solutions packages. In the depicted embodiment, component 122, via solution package discovery 216, generates and outputs optimized solution package 220 and priority relationship network 218. The priority relationship is derived from the paths in the solution package. For example, in priority relationship network 218, depicted in FIG. 2C, the relationship (a), (b), (d) is generated based on the first path on solution package 1 which is (a) on node 2, node 2 to (b) on node 3, and from node 3 to (d) on node 5 (e.g., (a)1, (a)2, (b)3, (d)5). Optimized solution package 220 is an optimized improvement over the current art, wherein component 122 generates and outputs optimized solution package 220 through heterogeneous network analysis 214 at a faster and more accurate rate to one or more clients. Priority relationship network 218 is the relationship network among business priorities 204 that were identified in heterogeneous network analysis 214 and used to output optimized solution package 220. The priority relationship networks 218 can help clients understand how priorities are associated and/or are dependent on solution contents 202, business priorities 204, and/or other solutions in a generated solution package (e.g., optimized solution package 220), and the order to be solved by corresponding solution packages.

In various embodiments of the present invention, component 122 receives or retrieves heterogeneous network 214 (i.e., priority solution item bipartite network 212 and solution items relationship network 210) as input and outputs solution packages. In various embodiments of the present invention, identifying solution packages comprises: (i) identifying solution items $S_i$ for given business priorities $P_i$, (ii) recursively backtrack the prerequisites for solution items in S, and find the root solution items that have no prerequisites and build the root solution items set SR, (iii) starting from the root solution items in SR, use graph search (DFS/BFS) to find paths that include solution items $S_i$, and (iv) generating solution packages by making different combinations of paths that cover all business priorities $P_i$. Each combination (i.e. one solution package) consists of paths with solution items $S_i$, which can cover all business priorities $P_i$.

Component 122 may mine business priority relationships and compare solution packages by (i) building a solution item relationship network, (ii) mapping priorities to solution items, (iii) discovering priorities relationship, and (iv) discovering and comparing solution packages. In various embodiments, building a solution item relationship network, comprises: collecting relationships that are manually defined by SMEs, mining relationships from historical solution package, and learning relationships based on text information in solution items by ML/DL models. In various embodiments, mapping priorities to solution items, comprise: mapping priorities to solution items through keyword/key phrase search, mapping priorities to solution items through full text similarity analysis based on text embedding algorithms, and generating the priority solution item bipartite network 212. In various embodiments, discovering priority relationships, comprises: creating heterogenous network based on priority solution item bipartite network and solution items network, and mining priority relationship through heterogeneous network analysis such as, random walk with restart algorithm, and matrix factorization.

In various embodiments, discovering solution package and comparing solution package, comprises: discovering solution package based on graph search algorithms, and calculating evaluation metrics, such as cost, delivery time, etc. for comparison. In various embodiments, discovering solution package based on graph search algorithms, comprises: identifying one or more solution items $S_i$ for given business priorities $P_i$, Recursively backtrack the prerequisites for solution items in S, and find the root solution items that have no prerequisites and build the root solution items set SR, Starting from the root solution items in SR, execute graph search (DFS/BFS) to find paths that include solution items $S_i$, and generating solution packages by making different combinations of paths. Each combination (i.e. one solution package) consists of paths with solution items $S_i$, which can cover all business priorities $P_i$.

Figure 2B:
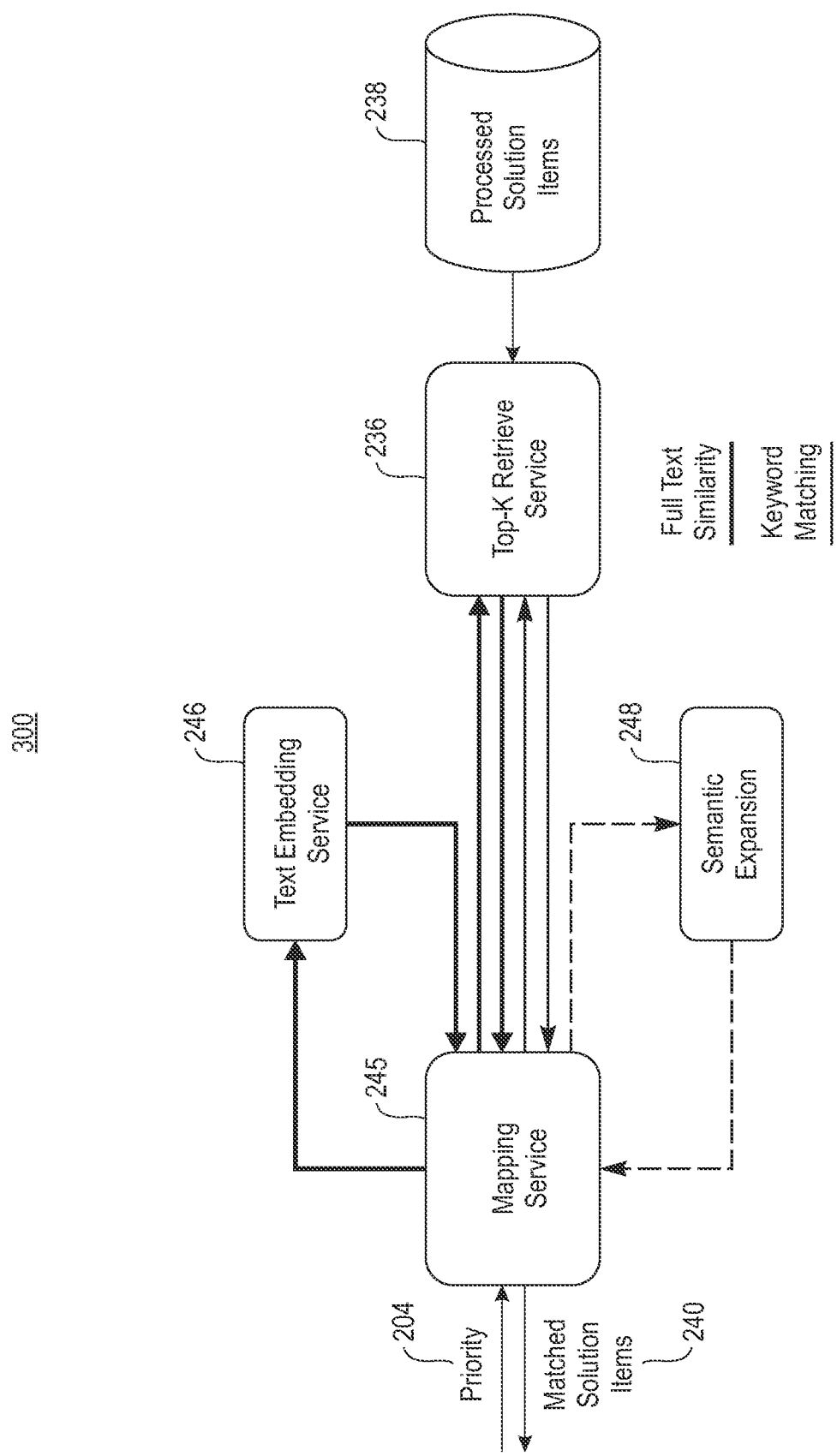
FIG. 2B illustrates dataflow example of the solution package generation component for priority to solution item mapping, in accordance with an embodiment of the present invention.
Figure 2C:
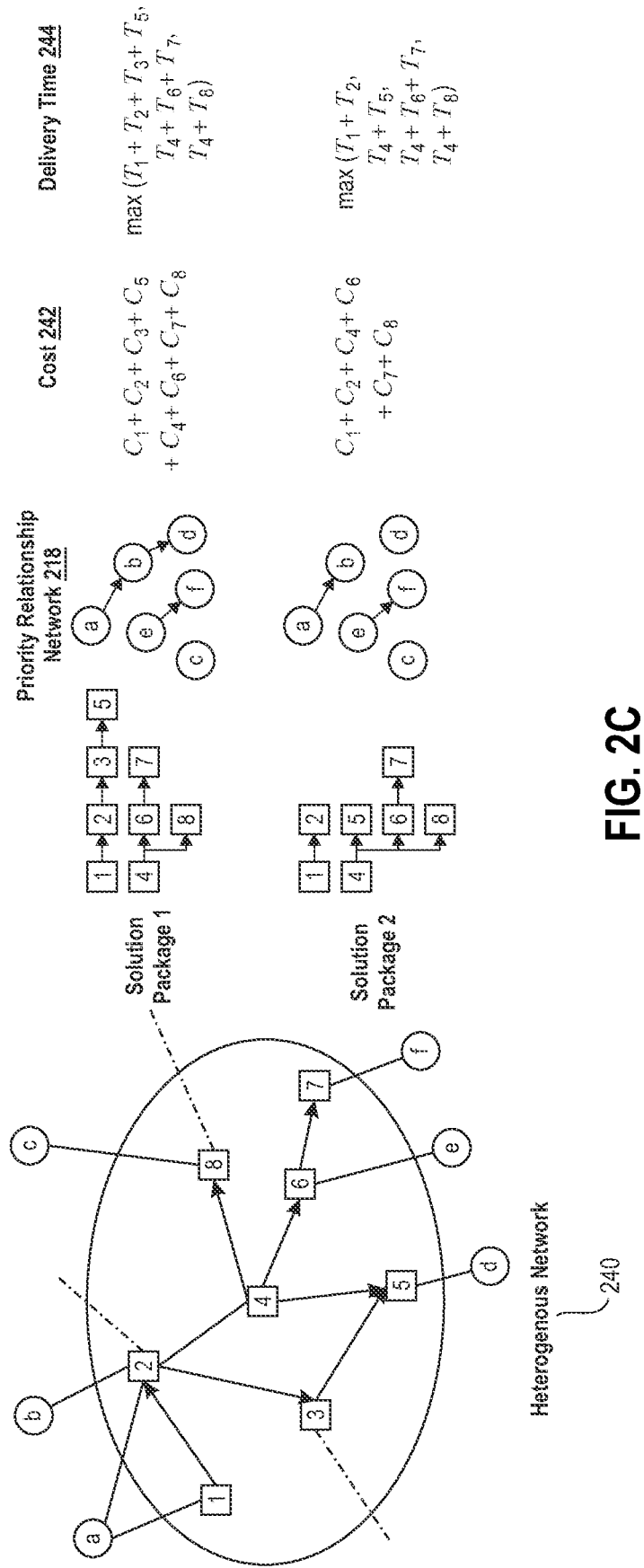
FIG. 2C depicts an example of solution package identification and comparison, in accordance with an embodiment of the present invention.

FIG. 2B illustrates one example of mapping the priority to solution item based on keyword and/or key phrase search or full text similarity by statistical methods and ML/DL models. In the depicted embodiment mapping service 245 receives one or more priorities (i.e., priority 321). During the execution of full text similarity, mapping service 245 may send an embedding request to text embedding service 246 In the depicted embodiment, text embedding service 246 responses to mapping service 245, via an embedding response. Mapping service 245 may issue a query request to top-k retrieve service 236 and retrieve or receive a query response from top-k retrieve service 236. Top-k retrieve service 236 may retrieve and/or receive one or more processed solutions from processed solution items 238 based on the query request for full-text similarity from mapping service 245. In the depicted embodiment top-k retrieve service 236 executes a response to mapping service 245 query request based on the embedding response and query request.

During the execution of key word matching, mapping service 245 may send an expansion request to semantic expansion 248. In the depicted embodiment, semantic expansion 248 responses to mapping service 245, via an expansion response. Mapping service 245 may issue a query request to top-k retrieve service 236 and retrieve or receive a query response from top-k retrieve service 236. Top-k retrieve service 236 may retrieve and/or receive one or more processed solutions from processed solution items 238 based on the query request for keyword matching from mapping service 245. In the depicted embodiment top-k retrieve service 236 executes a response to mapping service 245 query request based on the embedding response and query request. In various embodiments to the present invention, both business priority and solution items comprise text information (e.g., name, and/or short description).

FIG. 2C illustrates dataflow of component 122, generally designated 200, in communication with server computer 120 and/or computing device 110, within distributed data processing environment 100 of FIG. 1, for identifying client-satisfied solutions packages based on determined potential relationships, in accordance with an embodiment of the present invention. FIG. 2C provides an illustration of one implementation and does not imply any limitations with regard to the environments in which different embodiments may be implemented. Many modifications to the depicted environment may be made by those skilled in the art without departing from the scope of the invention as recited by the claims.

Solution package identification and comparison component 122 comprises identifying one or more solution packages through Breadth First Search (BFS) and/or Depth First Search (DFS) to find graph paths that contains solution items covering a plurality of business priorities. Business priorities may be predetermined and/or received from a user or database (e.g. local storage 104 and/or shared storage 124). An example of component 122, via solution package discovery 216, discovering one or more solution packages is depicted in FIG. 2C. Solution package discovery 216 may comparing solution package in terms of cost, delivery time, and/or any other metric or parameter known in the art.

In this particular example, heterogenous network 240 comprises solution contents and associated priority relationships of the solution contents. Heterogenous network 240 comprises solution contents (nodes 1-8) and priority relationships (e.g., business requirements a-f) linked in a network. In various embodiments, heterogenous network 240 may comprise N number of nodes and priority relationships, wherein N represents a positive integer, and accordingly the number of scenarios implemented in a given embodiment of the present invention. In the depicted embodiment, the connected paths in heterogenous network 240 represent received business requirements that fit within a priority relationship. In the depicted embodiment, node 1 and node 4 are independent meaning neither is dependent on another node (e.g., solution item).

In the depicted embodiment, component 122 generates solution packages based on the relationships/connections between solution contents and priority relationships, as depicted in solution package 1 and solution package 2. In various embodiments, there can be N number of solution packages, wherein N represents a positive integer, and accordingly the number of scenarios implemented in a given embodiment of the present invention. In the depicted embodiment, solution package 1 comprises a solution comprising nodes 1-3 and 5, nodes 4, 6, and 7, and nodes 4 and 8, wherein the solution contents fulfill the business requirements in priority relationship network 218 represented by business requirements a, b, and d, business requirements e and f, and business requirements c, respectively. Similarly, solution package 2 comprises a solution comprising nodes 1 and 2, nodes 4 and 5, nodes 4, 6, and 7, and nodes 4 and 8, wherein the solution contents fulfill the business requirements in priority relationship network 218 represented by business requirements a and b, business requirements d, business requirements e and f, and business requirements c, respectively.

In the depicted embodiment, component 122 calculates the cost of one or more generated solution packages, via cost 242, and outputs the one or more calculated costs for one or more generated solution packages to one or more users. In various embodiments, component 122 outputs a sorted list of generated solution packages, wherein the sorted list ranks the solution packages by cost and delivery time. In the depicted embodiment, the cost is calculated using the equation in cost 242, wherein the equation comprises adding the predetermined or preassigned cost of each node in a solution package. For example, in solution package 1 one of the solutions comprised nodes 1-3 and 5, wherein nodes 1-3 each have an assigned cost of $2,000 and node 5 has an assigned cost of $5,000. Here, based on the equation under cost 242 the total cost for this particular package would be $11,000 (e.g., $2,000+$2,000+$2,000+$5,000). In various embodiments, cost 242 can contain N number of cost elements, wherein N represents a positive integer, and accordingly the number of scenarios implemented in a given embodiment of the present invention. Similarly, component 122 calculates delivery time of solution packages, via delivery time 244, wherein the equation comprises adding the predetermined or preassigned delivery time for each node in a solution package.

Figure 3:
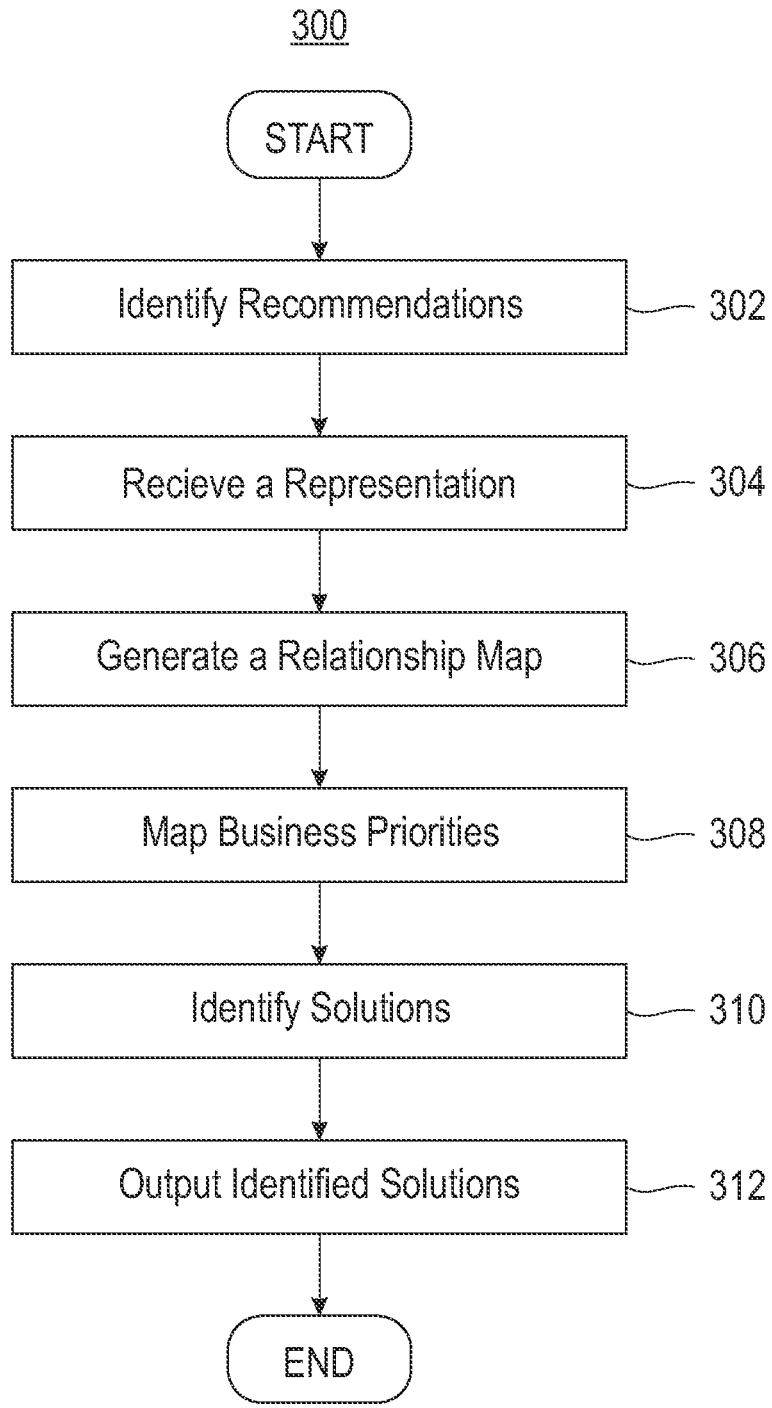
FIG. 3 illustrates operational steps of the solution package generation component, on a server computer within the distributed data processing environment of FIG. 1, for identifying client-satisfied solutions packages based on determined potential relationships, in accordance with an embodiment of the present invention.

FIG. 3 illustrates operational steps of component 122, generally designated 300, in communication with server computer 120 and/or computing device 110, within distributed data processing environment 100 of FIG. 1, for identifying client-satisfied solutions packages based on determined potential relationships, in accordance with an embodiment of the present invention. FIG. 3 provides an illustration of one implementation and does not imply any limitations with regard to the environments in which different embodiments may be implemented. Many modifications to the depicted environment may be made by those skilled in the art without departing from the scope of the invention as recited by the claims.

In step 302, component 122 identifies one or more recommendations. In various embodiments of the present invention, component 122 identifies, via a comparison of software product solutions and priorities relationships using Natural Language Processing/Natural Language Understanding techniques, text embedding algorithms and graph theory, business priorities and a new software product solution to recommend. In various embodiments of the present invention, both business priorities and solution package/product have text information.

In step 304, component 122 receives one or more electronic representations. In various embodiments of the present invention, component 122 receives one or more electronic representations of one or more software product solutions utilized by an organization, which is described in the text information.

In step 306, component 122 generates a relationship map. In various embodiments of the present invention, component 122 generates one or more software product solution relationship maps based on the one or more received electronic representations of one or more software product solutions utilized by an organization.

In step 308, component 122 maps business priorities. In various embodiments of the present invention, component 122 maps retrieved and/or received business priorities to the one or more generated software product solution relationship maps based on keyword and/or key phrase search or full text similarity using statistical methods and ML and/or DL models.

In step 310, component 122 identifies solutions. In various embodiments of the present invention, component 122 identifies one or more new software product solutions (e.g., solution packages) to recommend based upon the one or more mapped business priorities in step 308. In various embodiments of the present invention, component 122 recommends the identified solutions to one or more users, via interface 106.

In step 312, component 122 outputs identified solutions. In various embodiments of the present invention, component 122 outputs one or more identified new software product solutions (e.g., solution packages) to one or more users (e.g., clients) via interface 106. In various embodiments of the present invention, component 122 outputs a list of identified solutions, wherein the list of identified solutions is ranked based on metrics such as cost 242, delivery time 244, and/or other metrics known in the art. In some embodiments, component 122 may issue alerts to users to notify users of the generated and output solution packages. In various embodiments of the present invention, component 122 may display, via interface 106, a ranked list of identified solutions in a solution package that details the cost and delivery time of each identified solution (e.g., solution package). A user may customize a solution package, via interface 106, by selecting identified solutions in the displayed ranked list, wherein component 122 is responsive to the user's selection and formulates cost and delivery time for the customized solution package.

Figure 4:
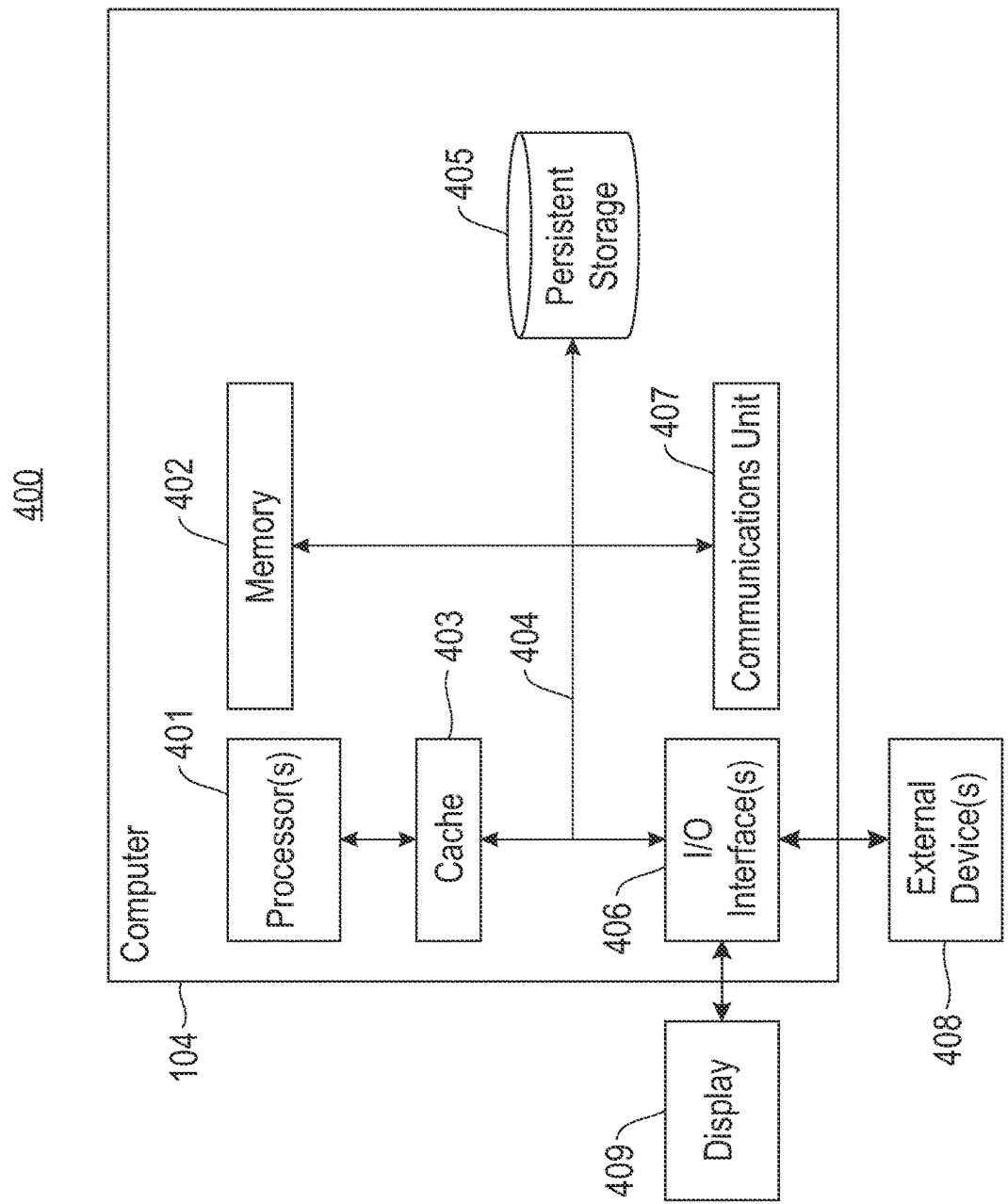
FIG. 4 depicts a block diagram of components of the server computer executing the modification component within the distributed data processing environment of FIG. 1, in accordance with an embodiment of the present invention.

FIG. 4 depicts a block diagram of components of server computer 120 within distributed data processing environment 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 depicts computer system 400, where server computing 120 represents an example of computer system 400 that includes component 122. The computer system includes processors 401, cache 403, memory 402, persistent storage 405, communications unit 407, input/output (I/O) interface(s) 406, display 409, external device(s) 408 and communications fabric 404. Communications fabric 404 provides communications between cache 403, memory 402, persistent storage 405, communications unit 407, and input/output (I/O) interface(s) 406. Communications fabric 404 may be implemented with any architecture designed for passing data and/or control information between processors (such as microprocessors, communications, and network processors, etc.), system memory, peripheral devices, and any other hardware components within a system. For example, communications fabric 404 may be implemented with one or more buses or a crossbar switch.

Memory 402 and persistent storage 405 are computer readable storage media. In this embodiment, memory 402 includes random access memory (RAM). In general, memory 402 may include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 enables for input and output of data with other devices that may be connected to each computer system. For example, I/O interface 406 may provide a connection to external devices 408 such as a keyboard, keypad, a touch screen, and/or some other suitable input device. External devices 408 may also include portable computer readable storage media such as, for example, thumb drives, portable optical or magnetic disks, and memory cards. Software and data used to practice embodiments of the present invention may be stored on such portable computer readable storage media and may be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for identifying client-satisfied solutions packages based on determined relationships, the computer-implemented method comprising:
   identifying one or more business priorities and software product solutions to recommend to a user, wherein identifying the business priorities and the software product solutions to recommend comprises:
  comparing, by a natural language processor and one or more natural language understanding techniques, a plurality of the software product solutions and business priorities relationships;
  receiving one or more electronic representations of the software product solutions utilized by an organization, wherein the electronic representation describes the software product solution in text information;
  generating one or more software product solution relationship maps based on the one or more received electronic representations of one or more software product solutions utilized by the organization;
  mapping retrieved and received business priorities to the one or more generated software product solution relationship maps based on keyword and key phrase searches or full text similarity using statistical methods and machine learning models;
  creating a heterogeneous network by combining a solution items network and a priority solution item bipartite network, wherein an identified relationship and a priority mapping in a content relationship mining engine and a priority to content mapping component are combined into a network and used by the heterogeneous network to identify the one or more solution packages, and wherein the creating of the heterogenous network comprises:
    analyzing a priority solution item bipartite network and a solution items network based upon an analysis of the heterogeneous network; and
    executing a solution package discovery and comparison by discovering one or more solution packages through Breadth First Search (BFS) or Depth First Search (DFS) to find graph paths that contains solution items covering a plurality of business priorities.

2. The computer-implemented method of claim 1, further comprising:
  receiving business priority input, wherein the received business priority input comprises:
    presenting to the user, by the user interface, an option to select, via a response pop-up window, between predetermined business priority inputs or the option to enter custom priority inputs.

3. The computer-implemented method of claim 2, further comprising:
  responsive to receiving a selection by the user, executing the predetermined priority inputs or enabling the user to enter custom priority inputs through the user interface.

4. The computer-implemented method of claim 1, further comprising:
  generating a solution items network, wherein generating the solution items network comprises:
    identifying, by content relationship mining engine, one or more content relationships from usage-data driven relationship mining, one or more Subject-Matter Expert (SME) predefined relationships, and machine learning of the one or more received electronic representations of the one or more software product solutions.

5. The computer-implemented method of claim 1, further comprising:
  issuing an alert to the user to notify the user of the output one or more solution packages.

6. The computer-implemented method of claim 5, further comprising:
  displaying, by the user interface, a ranked list of identified solutions in a solution package, wherein a cost and a delivery time are detailed in the solution package of each identified solution in the solution package, and wherein responsive to a selection by the user to customize a solution package through the interface by selecting the identified solutions from the displayed ranked list, formulating the cost and the delivery time for the customized solution package based on the received selection by the user.

7. A computer system for identifying client-satisfied solutions packages based on determined relationships, the computer system comprising:
  one or more computer processors;
  one or more computer readable storage devices;
  program instructions stored on the one or more computer readable storage devices for execution by at least one of the one or more computer processors, the stored program instructions comprising:
    program instructions to identify one or more business priorities and software product solutions to recommend to a user, wherein identifying the business priorities and the software product solutions to recommend comprises:
      program instructions to compare, by a natural language processor and one or more natural language understanding techniques, a plurality of the software product solutions and business priorities relationships;
    program instructions to receive one or more electronic representations of the software product solutions utilized by an organization, wherein the electronic representation describes the software product solution in text information;
    program instructions to generate one or more software product solution relationship maps based on the one or more received electronic representations of one or more software product solutions utilized by the organization;
    program instructions to map retrieved and received business priorities to the one or more generated software product solution relationship maps based on keyword and key phrase searches or full text similarity using statistical methods and machine learning models;
    program instructions to create a heterogeneous network by combining a solution items network and a priority solution item bipartite network, wherein an identified relationship and a priority mapping in a content relationship mining engine and a priority to content mapping component are combined into a network and used by the heterogeneous network to identify the one or more solution packages, and wherein the creating of the heterogenous network comprises:
    program instructions to analyze a priority solution item bipartite network and a solution items network based upon an analysis of the heterogeneous network; and
    program instructions to execute a solution package discovery and comparison by discovering one or more solution packages through Breadth First Search (BFS) or Depth First Search (DFS) to find graph paths that contains solution items covering a plurality of business priorities.

8. The computer system of claim 7, further comprising:
  program instructions to receive business priority input, wherein the received business priority input comprises:

program instructions to present to the user, by the user interface, an option to select, via a response pop-up window, between predetermined business priority inputs or the option to enter custom priority inputs.

9. The computer system of claim 8, further comprising: responsive to receiving a selection by the user, program instructions to execute the predetermined priority inputs or enabling the user to enter custom priority inputs through the user interface.

10. The computer system of claim 7, further comprising: program instructions to generate a solution items network, wherein generating the solution items network comprises:
    program instructions to identify, by content relationship mining engine, one or more content relationships from usage-data driven relationship mining, one or more Subject-Matter Expert (SME) predefined relationships, and machine learning of the one or more received electronic representations of the one or more software product solutions.

11. The computer system of claim 7, further comprising: program instructions to issue an alert to the user to notify the user of the output solution packages.

12. The computer system of claim 11, further comprising: program instructions to displaying, by the user interface, a ranked list of identified solutions in a solution package, wherein a cost and a delivery time are detailed in the solution package of each identified solution in the solution package, and wherein responsive to a selection by the user to customize a solution package through the interface by selecting the identified solutions from the displayed ranked list, program instructions to formulate the cost and a delivery time for the customized solution package based on the received selection by the user.

13. A computer program product for identifying client-satisfied solutions packages based on determined relationships, the computer program product comprising:
    one or more computer readable storage devices and program instructions stored on the one or more computer readable storage devices, the stored program instructions comprising:
        program instructions to identify one or more business priorities and software product solutions to recommend to a user, wherein identifying the business priorities and the software product solutions to recommend comprises:
            program instructions to compare, by a natural language processor and one or more natural language understanding techniques, a plurality of the software product solutions and business priorities relationships;
        program instructions to receive one or more electronic representations of the software product solutions utilized by an organization, wherein the electronic representation describes the software product solution in text information;
        program instructions to generate one or more software product solution relationship maps based on the one or more received electronic representations of one or more software product solutions utilized by the organization;
        program instructions to map retrieved and received business priorities to the one or more generated software product solution relationship maps based on keyword and key phrase searches or full text similarity using statistical methods and machine learning models;
        program instructions to create a heterogeneous network by combining a solution items network and a priority solution item bipartite network, wherein an identified relationship and a priority mapping in a content relationship mining engine and a priority to content mapping component are combined into a network and used by the heterogeneous network to identify the one or more solution packages, and wherein the creating of the heterogenous network comprises:
            program instructions to analyze a priority solution item bipartite network and a solution items network based upon an analysis of the heterogeneous network; and
        program instructions to execute a solution package discovery and comparison by discovering one or more solution packages through Breadth First Search (BFS) or Depth First Search (DFS) to find graph paths that contains solution items covering a plurality of business priorities.

14. The computer program product of claim 13, further comprising:
    program instructions to receive business priority input, wherein the received business priority input comprises:
    program instructions to present to the user, by the user interface, an option to select, via a response pop-up window, between predetermined business priority inputs or the option to enter custom priority inputs; and
    responsive to receiving a selection by the user, program instructions to execute the predetermined priority inputs or enabling the user to enter custom priority inputs through the user interface.

15. The computer program product of claim 13, further comprising:
    program instructions to generate a solution items network, wherein generating the solution items network comprises:
    program instructions to identify, by content relationship mining engine, one or more content relationships from usage-data driven relationship mining, one or more Subject-Matter Expert (SME) predefined relationships, and machine learning of the one or more received electronic representations of the one or more software product solutions.

16. The computer program product of claim 13, further comprising:
    program instructions to issue an alert to the user to notify the user of the output solution packages.

17. The computer program product of claim 16, further comprising: program instructions to displaying, by the user interface, a ranked list of identified solutions in a solution package, wherein a cost and a delivery time are detailed in a solution package of each identified solution in the solution package, and wherein responsive to a selection by the user to customize a solution package through the interface by selecting the identified solutions from the displayed ranked list, program instructions to formulate the cost and a delivery time for the customized solution package based on the received user selection.

* * * * *